United States Patent [19]

Wood et al.

[11] Patent Number: 4,616,489
[45] Date of Patent: Oct. 14, 1986

[54] STOCK WASHER

[75] Inventors: Robert F. Wood, Portland, Oreg.; William R. Vanderveer, Vancouver, Wash.

[73] Assignee: Fabcon, Inc., San Francisco, Calif.

[21] Appl. No.: 665,677

[22] Filed: Oct. 29, 1984

[51] Int. Cl.$^4$ .............................................. D21C 9/02
[52] U.S. Cl. ....................................................... 68/200
[58] Field of Search ............................ 68/200, 205 R; 15/306 A; 162/60, 208, 279; 239/283, 590.3, 590.5, 602; 118/DIG. 4, 415

[56] References Cited

U.S. PATENT DOCUMENTS

| 2,392,085 | 1/1946 | Ferrel | 239/602 X |
| 2,441,454 | 5/1948 | Taylor | 118/415 X |
| 2,796,846 | 6/1957 | Trist | 118/415 X |
| 2,949,239 | 8/1960 | Goyette | 239/590.3 X |
| 4,205,541 | 6/1980 | Zucker | 68/200 |

FOREIGN PATENT DOCUMENTS

| 01399 | 4/1983 | European Pat. Off. | 239/590.3 |
| 2043449 | 3/1972 | Fed. Rep. of Germany | 118/DIG. 4 |

Primary Examiner—Philip R. Coe
Attorney, Agent, or Firm—Townsend & Townsend

[57] ABSTRACT

An improved stock washer for removing impurities from a porous mat disposed over a vacuum head is disclosed. In one application in connection with an industrial paper making process, paper pulp forms a porous mat over a rotating drum which has a vacuum on the inside. The washer includes an elongate housing, defining a chamber therein, disposed above the drum with a slot along its bottom and resilient, downwardly-extending wipers at the slot edges, Water flows into a pipe extending the length of the chamber. The pipe has holes along its sides to direct water into the chamber downwardly and outwardly. The pipe, which extends through the ends of the housing, is mounted to adjustable mounts at both ends to allow the washer height above the mat to be adjusted. Water flows through the holes in the pipe and accumulates at the chamber bottom where it is directed into the mat by the resilient wipers. The water flows through the mat into the drum displacing chemical impurities in the process. The wipers can be attached at an angle relative to the washer so that the washer may be placed other than centered directly above the drum while the chamber remains vertical, thus allowing a number of spaced apart washers to be used. A bracketing mechanism is also disclosed which allows the wipers to be easily attached to the washer.

11 Claims, 5 Drawing Figures

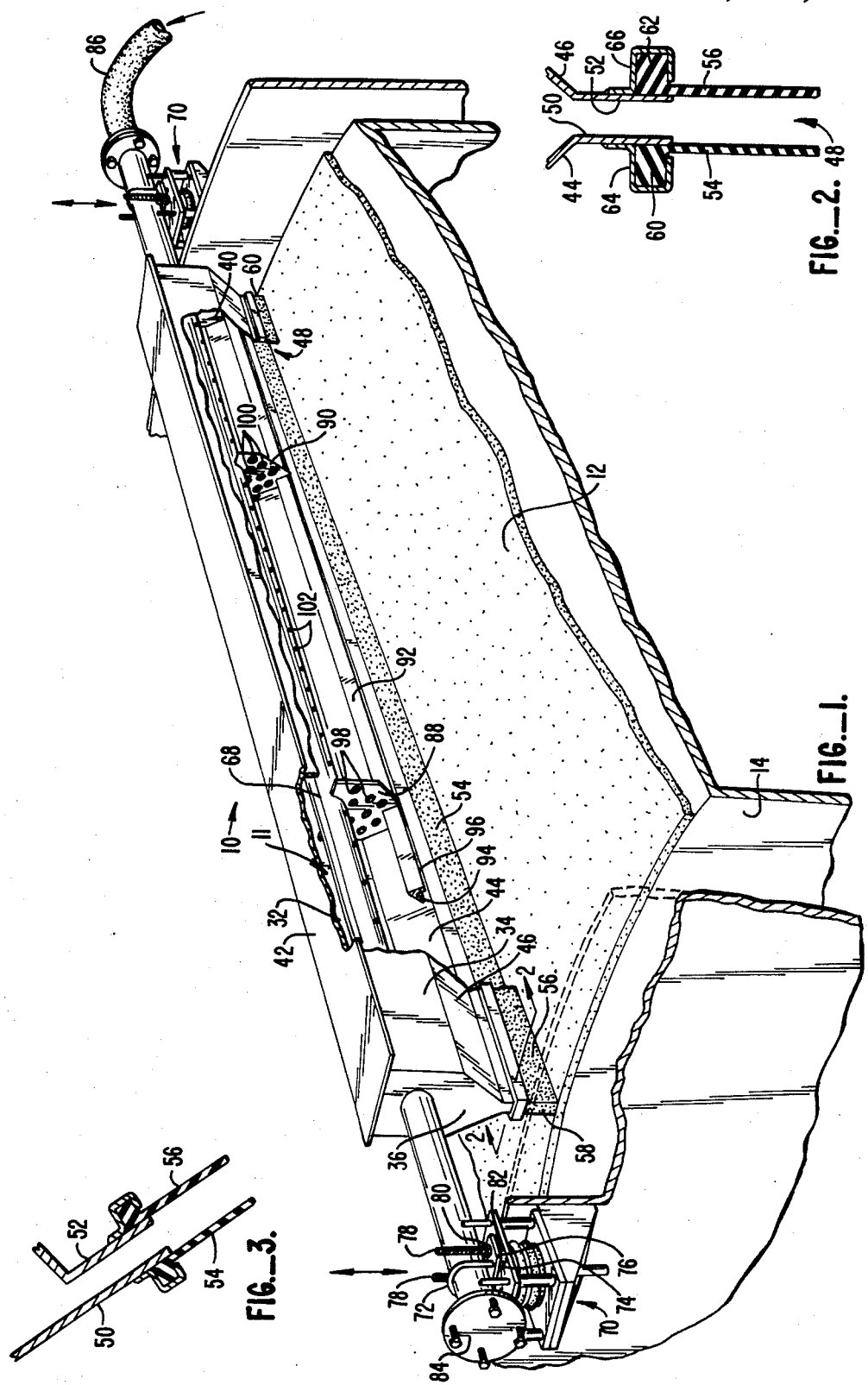

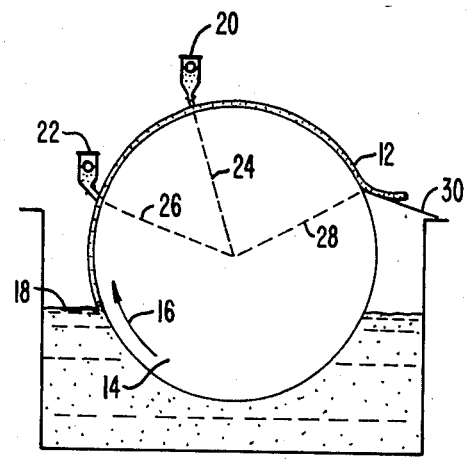
FIG._4.
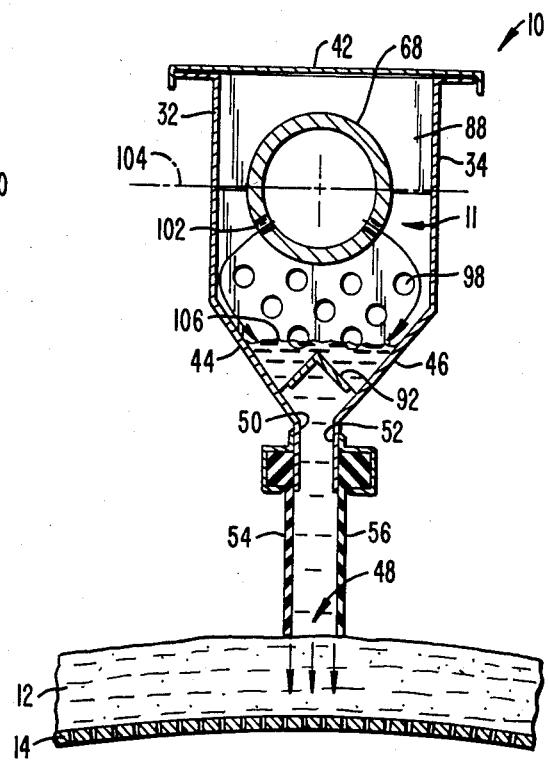
FIG._5.

STOCK WASHER

BACKGROUND OF THE INVENTION

The invention relates to stock washers for removing impurities or other substances from a porous mat disposed over a vacuum head.

Various industrial processes often require that a mass of porous material be washed in order to remove chemicals or other impurities. For example, this need appears in the sugar industry, where sugar is washed from bagasse; in the textile industry, where excess dyes are washed from the fabric; in mining, where impurities are washed from ore; and in the paper industry, as follows.

In a standard paper production line, wood chips are cooked with chemicals in aqueous solution, the precise composition of the cooking chemicals depending on the particular process. This step, normally carried out in a digester under heat and pressure, breaks down the wood by dissolving the organic compounds that hold the cellulose fibers together.

The mixture of pulp, spent cooking chemicals, and organic materials, collectively known as stock, is then fed to a series of washers. The most common type of washer system includes a rotary vacuum drum onto which the stock is spread. The drum is perforated, and a vacuum maintained inside causes the separation of liquid from the pulp. The mixture assumes the form of a pulp mat which is still impregnated with chemicals and organics. A washer usually disposed above, and extending axially along the drum, directs water at and through the pulp mat to remove these substances. A typical installation would use three washer drums in sequence, with wash water being flowed counter-current to the direction of the pulp movement so that the final washing stage uses clean water. An additional washing stage to remove bleaching chemicals is required if the washed pulp is subsequently bleached. A hood is placed over the drum and washers to prevent steam energy from being lost and to protect workers from the chemicals.

The effluent from the washers, comprising water, spent cooking chemicals, and organic materials, is referred to as liquor. In a kraft (or sulfate) process, it is called black liquor; in a sulfite process, red liquor. Typical liquor contains approximately 15% solid material. It is desirable to separate this solid material from the water to allow reuse of the inorganic pulping chemicals, and to eliminate the environmental problem of disposing of the liquor.

Evaporation is the standard separation method, with the liquor being passed through a series of evaporators, in which steam is passed counter-current to the liquor flow. In this way, the liquor is concentrated until it contains approximately 60% solids, at which point it is burnt in a boiler. The organic materials provide the fuel to generate the steam, and the inorganic chemicals smelt out the bottom of the boiler. In a typical paper mill, the steam from the liquor recovery part of the cycle supplies most of the mill's steam needs.

It is apparent that the more dilute the liquor, the more energy must be expended in evaporating the water in order to recover the solids. This is energy that is therefore unavailable for other energy needs of the paper mill. At the same time, it is necessary to efficiently remove the chemicals from the pulp to provide a satisfactorily clean pulp. A thorough washing militates toward the formation of dilute liquors.

One existing washer is a washer sold under the name Uniflow by Comarco Industrial, Inc. of Beaverton, Oreg. This washer is disclosed in U.S. Pat. No. 4,205,541 and includes an elongate chamber placed axially above the drum. The chamber has an upper region comprising a flat plate with a gutter down its middle and a number of holes on the vertical sides of the gutter for allowing water which covers the plate to spill into the lower portion of the chamber. The lower portion of the chamber is narrow and structured so that a head of water can build up to give a static pressure for the water which will leave the chamber through a slot along the bottom of the chamber. The pressure of the water built up in the chamber in combination with the vacuum within the drum causes the water to flow through the pulp mat. Additionally, resilient wipers may be attached to the slot to guide the water to the mat and keep the flow of water perpendicular to the mat, thus helping to force the water through the mat.

In operation, it has been discovered that the holes in the vertical portion of the plate in the upper chamber cause the water to impinge against the chamber sides and generate foam within the chamber. The foam represents the introduction of air into the water which when forced into the mat prevents the chemicals from being displaced from the mat and hampers the efficiency of the washer. The upper chamber also requires an inlet pipe to be connected to the top of the chamber, thus causing clearance problems with existing hoods which cover the washer and drum to contain any spray and protect workers. The lack of sufficient clearance requires the hoods to be cut away and reconstructed to accommodate such an inlet pipe.

To the extent that water is introduced into the chamber under pressure (to increase the efficiency of the washer) the top of the chamber is bolted on over a gasket and the top of the chamber is rounded, rather than flat, to help withstand pressure in the upper chamber. Leakage problems through the gasket have resulted from this usage of the upper chamber as a pressurized chamber. The need for a large number of bolts to secure the top cover of the chamber makes cleaning of the upper chamber difficult since each bolt must be removed to do so. In addition, the rounded structure of the top cover aggravates the hood clearance problem.

The resilient wipers used with the Uniflow washer have been attached to the slot at the bottom of the chamber with a number of nuts and bolts which run through holes drilled in the wipers. Replacing the wipers requires removal of all the nuts and bolts, which are typically placed approximately every three inches. The wipers have to be machined to add holes in the appropriate positions, which limits the materials which can be used for the wipers to those which can withstand and hold up after having holes drilled in them and additionally increases the cost of producing the wipers. A large number of bolts are required because the wiper pulls against each bolt, and the pulling force must be spread out to reduce tearing of the wiper due to such pulling forces.

The Uniflow washer is supported only at its ends. Depending upon the materials used, length of the washer, water flow, and so forth, it has been observed that the washer may tend to sag in the middle, thus producing an uneven distribution of water over the mat. Additionally, such sagging aggravates the clearance problem both above the mat and below the hood.

Another drawback of Uniflow washers arises when several washers are used for a single drum, with only one washer directly vertically above the drum. The other washers are positioned along the drum upstream of such vertical washer at an angle to the vertical. The steepness of such angle is limited because the water in the chamber will spill out at some point as the angle increases. This limitation on the distance between washers limits the time available for water to flow through the mat between washers, and thus limits the efficiency of the washers.

SUMMARY OF THE INVENTION

The present invention is an improved washer of the Uniflow type wherein the upper chamber is replaced with a pipe having a series of holes along the side of the pipe. The pipe extends through the top of the chamber allowing water or other cleaning liquid to be forced through the pipe and through the holes in the pipe into the chamber. The holes in the pipe are an angle downward from the horizontal, thus causing the water forced through the holes to impinge on the side of the chamber at a downward and outward angle. This angle reduces the horizontal component of the force with which the water impinges against the side of the chamber. This results in lower impact force and therefore less foam being generated within the chamber.

The use of a horizontal pipe extending through the chamber allows the inlet to be attached to the side of the chamber, rather than the top of the chamber, thereby eliminating the clearance problem of the prior art washers where a hood covered the drum. Additionally, because the water can be introduced into the pipe under pressure with the pipe itself acting as a pressure chamber, there is no need for a rounded pressure-withstanding top to the chamber. Therefore the top of the chamber can be replaced by a flat top which further reduces clearance problems.

Because the chamber is not pressurized, fewer bolts can be used to secure it to the chamber, thereby reducing the weight and cost of the chamber, compared with prior art Uniflow-type washers. The use of a pipe extending through both ends of the container allows the inlet to be attached to either end of the chamber, thereby allowing the washer to be easily adapted to existing plants without requiring additional piping. The pipe used for the washer can be a standard schedule forty pipe, thus reducing the expense of constructing the washer. The use of the pipe also reduces the weight of the chamber overall, thus helping to alleviate sag problems with the washer.

The pipe itself is used to support the chamber, rather than brackets attached to the chamber as in previous Uniflow-type washers. This simplifies the design by having the pipe serve the dual functions of acting as the upper chamber and as the chamber support. Because the circular structure of the pipe together with other aspects of the washer results in a stronger, more rigid support than the structure of the previous Uniflow-type washer's support system, sagging of the washer is further reduced.

The use of a pipe enables the upper chamber, i.e. the pipe itself, to be easily cleaned without removing the top cover. A brush can be run through the pipe from one of the sides forcing small particles of residue through the holes in the pipe into the chamber and out the bottom, and forcing larger particles through the pipe and out the other end of the pipe. Thus, cleaning can be very simply and easily done.

The improved washer also uses wipers which have a wide upper end, or rib, over which a complementary-shaped bracket can be placed, thereby allowing the wiper to be easily bracketed to the lower part of the chamber. Thus, the need to have holes machined in the wipers is eliminated, thereby reducing the cost of the wipers. The use of the brackets allows the wipers to be easily replaced without requiring a large number of bolts to be undone by simply sliding the old wiper out and a new wiper in under the bracket. The ease of replacing the wipers allows a washer with wipers suitable for one application to be modified for another application requiring a wiper made of different material. In addition, the bracket connection causes the pulling force of the wiper to be evenly distributed, and thus the wiper will not tear and come loose as it would if bolts were used to connect it to the washer. The use of a single bracket running the length of the washer also adds to the structural strength of the washer to help prevent sagging.

The improved washer also provides for the angle of the wipers relative to the washer to be varied so that when the washer is placed at other than directly above the drum, the chamber can remain vertical while the wipers are tilted at an angle so that they are perpendicular to the drum. This enables the washer to be placed lower around the circumference of the drum than with the previous Uniflow-type washer design. The efficiency of the washing is improved by allowing water to be forced through the mat at an earlier point and allowing more washers to be placed over the drum.

The ability to place the washer lower around the circumference of the drum, along with the reduction of the amount of foam introduced in the chamber, results in the ability to wash the chemicals out of the mat with a smaller amount of water required for a given wash effectiveness. The water savings translates into an energy savings in recovering solids from the liquor.

BRIEF DESCRIPTION OF THE DRAWINGS

FIG. 1 is an overall perspective view of a preferred embodiment of a washer disposed above a paper pulp mat on a vacuum drum, partially cut away to show the internal components.

FIG. 2 is a sectional view showing the preferred embodiment of the wiper attachment to the washer.

FIG. 3 is a sectional view showing the preferred embodiment of the wiper attachment to a washer disposed at an angle to the drum.

FIG. 4 is a schematic view showing a typical disposition of two washers on a drum.

FIG. 5 is a schematic section showing the operation of the washer.

DESCRIPTION OF THE PREFERRED EMBODIMENT

Broadly, the present invention washes chemicals or other substances out of a porous mat by directing a pressurized column of water perpendicularly through the mat. The mat is typically disposed on a vacuum head, such as a rotary vacuum drum.

FIG. 1 shows a single axially extending washer 10 positioned above a paper pulp mat 12 which is formed on a rotary vacuum drum 14. In order to clearly set forth the features and operation of the present invention, a brief summary of the operation of rotary vacuum drum 14 is useful. This is best done with reference to FIG. 4. Rotary drum 14 is mounted for rotation about a horizontal axis in the direction of arrow 16. Stock comprising pulp, spent cooking chemicals and water is continuously fed from a digester (not shown) into a vat where it forms a pool 18 in which drum 14 is partially submersed. Drum 14 has a perforated outer shell and a source of vacuum inside that is communicated to the outside through the perforations. Therefore, as drum 14 rotates, pulp mat 12 forms on the outside of the drum and liquid is withdrawn by the vacuum.

At a position generally near the top of the drum, the mat passes under one or more washers whose purpose is to remove chemical impurities. Proper washing can often be achieved with two washers per rotary vacuum drum. A typical alignment might have a pair of washers 20 and 22 situated above drum 14 at approximately 10° and 35° before top dead center, as indicated by dashed lines 24 and 26, respectively. At a point approximately 70° beyond top dead center, indicated by dashed line 28, the vacuum is released and the pulp mat separated from the rotating drum. The separation is effected by a doctor blade 30 or the like, which may be a mechanical device or may comprise a linear array of nozzles for directing pressurized air or stream upwardly underneath the mat. The washed mat is then sent to subsequent washing stages with similar vacuum drum/washer configurations.

Having thus set forth the relation between the individual washers and the rotary vacuum drum, the particular configuration of the preferred embodiment of a washer can be discussed. Referring to FIGS. 1, 2 and 5, washer 10 comprises an elongate chamber 11 defined by axially extending side walls 32 and 34, end walls 36 and 40, top 42, and sloping bottom panels 44 and 46. Downwardly sloping panels 44 and 46 are angled toward one another, but terminate before they meet, thereby defining an elongate slot 48 extending axially along the bottom of chamber 11. Sloping panels 44 and 46 are provided with respective downwardly extending flanges 50 and 52 along their lengths. Resilient wipers 54 and 56 are affixed to flanges 50 and 52 along their respective lengths, and extend downwardly to contact the pulp mat along its axial dimension. Resilient end flaps 58 and 60 extend the width of slot 48, and together with wipers 54 and 56, provide a continuous sealing structure about the entire perimeter of slot 48. Wipers 54 and 56 have upper wider portions 60 and 62, respectively. Complementary brackets 64 and 66 partially surround portions 60 and 62 and fasten wipers 54, 56 to washer 10. Brackets 64, 66 may be welded or bolted to flanges 50 and 52. Wipers 54, 56 can thus be molded without requiring any machining, and can be easily attached to washer 10 by sliding them into brackets 64 and 66. Wipers 54, 56 can also thus be easily replaced so that washer 10 can be adapted to different applications by changing the wipers. The elimination of machining for wipers 54, 56 allows a wider variety of materials to be used. The use of single, long brackets 64, 66 rather than a series of bolts adds support and strength to washer 10. This additional support is especially effective because it is removed from the centroid of washer 10.

A pipe 68, such as a 3-inch schedule 40 pipe, extends through chamber 11 and end walls 36 and 40. Pipe 68 is mounted on a pair of mounts 70. Pipe 68 is secured to each mount 70 by a U-bolt 72 which is fastened by a pair of nuts 74 to a member 76. Member 76 encloses a pair of threaded shafts 78. The height of member 76, and thus pipe 68, is adjusted by adjusting bolts 80 and 82 on each shaft 78. A cap 84 is attached to the end of pipe 68 not used for the inlet. An inlet hose 86 is attached to the other end of pipe 68. Because inlet hose 86 attaches to the side of washer 10, rather than the top as in previous washers, less clearance above the washer is required. This enables washer 10 to be placed in existing plants where a hood covers the rotary drum without the need to cut the hood to accommodate an inlet pipe. Additionally, because the inlet can be attached to either end of washer 10, this washer can be placed in existing plants without requiring a rerouting of the water pipes.

The adjustable mount 70 allows the height of washer 10 above pulp mat 12 to be adjusted so that resilient wipers 54 and 56 just touch pulp mat 12 along its entire axial dimension. The height of washer 10 can be easily adjusted to accommodate mats of different thicknesses.

Disposed within chamber 11 of washer 10 are vertical dispersion plates 88 and 90. Vertical plates 88 and 90 are perpendicular to the axial dimension of the washer, and each extends horizontally from side wall 32 to side wall 34. Plates 88 and 90 each extend vertically from sloping bottom portions 44 and 46 to a height part way up side walls 32 and 34. Each of plates 88 and 90 has a downwardly opening V-shaped notch into which is seated a downwardly facing V-shaped channel member 92. The V-shaped notches and V-shaped channel are sized so that the axially extending edges 94 and 96 of V-shaped channel 92 do not touch either sloping bottom portions 44 and 46 or flanges 50 and 52, but rather leave a small clearance which may be variable, typically ¼", for water flow as will be described below. Each of plates 88 and 90 is provided with a plurality of apertures, plate 88 having apertures 98 and plate 90 having apertures 100. These apertures are sufficiently large that they do not become plugged by fibers entrained in the washer water.

Pipe 68 extends through washer 10 and has a plurality of apertures 102 below the horizontal axis 104 of pipe 68 and extending from side wall 36 to side wall 40. The circular section of pipe 68 together with the other aspects of washer 10 create a strong structure and allows the pipe to easily support the washer. It has been found that a standard 3 inch schedule 40 pipe can be used in washers 10. By using pipe 68 as an upper water chamber, top cover 42 need not be capable of withstanding pressure and thus can be flat and can have fewer fasteners. Therefore, pipe 68 permits washer 10 to be lighter and stronger, resulting in a substantial reduction of sag in the middle of washer 10. The use of pipe 68 and the design changes resulting from such use reduces the number of bolts and simplifies the surface of washer 10, thereby making it easier to coat with an anticorrosive paint.

FIG. 5 illustrates the operation of washer 10. Washer 10 is disposed above pulp mat 12 on rotary vacuum drum 14. Water entering chamber 11 of washer 10 through pipe 68 flows through apertures 102, past V-shaped channel 92, through slot 48 and into contact with the outer surface of pulp mat 12. The water in contact with mat 12 is at a pressure above atmospheric due to the static pressure head resulting from the liquid level 106 in washer 10 above mat 12.

The water in contact with pulp mat 12 is thus at a higher pressure than the pressure on the inside of rotary vacuum drum 14. Wipers 54 and 56 prevent movement of the water tangentially with respect to mat 12. Since mat 12 is porous, the pressure differential causes the water to flow perpendicularly through the mat to the interior of the drum. As the water between the wipers flows through the mat, water above it in the chamber replaces it. The flow of water into the mat positively displaces water and chemicals within the mat, thereby affecting a cleaning.

The location of the washers is chosen to allow most of the liquid in the mat to be withdrawn by the vacuum before the mat passes under the washers. That is, the mat approaches the first or any washer in a relatively dry state. The relative location of the washers is also chosen to allow withdrawal of most of the liquid injected by one washer before injection of liquid by a subsequent washer. In this way, the wash water is used most effectively, i.e., displacement washing.

The washer components, with the exception of the wipers and end flaps, are preferably made of stainless steel to resist the effects of the chemicals. This is usually important, since a typical installation uses wash water several times before it is sent to the liquor recovery step. Thus, only the last washer in the sequence would be using clean water, the earlier washers using water that has a considerable amount of chemicals in it. Wipers 54, 56 are preferably made of a resilient material to accommodate irregularities in the mat. At the same time, they must be rigid enough to prevent tangential flow of the water between the wipers, which water is at an elevated pressure. The material must also be resistant to chemical attack. Special rubbers or synthetics may be used, for example.

Referring to FIGS. 3 and 4, wipers 54 and 56 on a washer 22 are attached at an angle to the washer so that the washer remains vertical while the wipers are perpendicular to the surface of drum 14. Flanges 50 and 52, shown in FIG. 3, are disposed at the proper angle so that wipers 54, 56, when attached, will be at the same angle. Flange 50 of the FIG. 3 embodiment, being lower on drum 14, is longer than flange 52 so that the outer edges of wipers 54, 56 are equidistant from mat 12. The arrangement of the wipers at an angle allows washer 22 to be placed lower around the circumference of drum 12 without water being unevenly disposed in the bottom of washer 22. Thus, a greater surface area of drum 14 can be covered by washers 10. This increased cleaning efficiency is a result of both the increased evenness of the water flow due to the vertical alignment of the washer, and the cleaning water having more time and more opportunities (due to more washers) to flow through mat 12 in a true displacement fashion.

As will be understood by those familiar with the art, the present invention may be embodied in other specific forms without departing from the spirit or essential characteristics thereof. For instance, the washer could be placed over a flat porous mat rather than a mat on a rotary drum. Accordingly, disclosure of the preferred embodiments of the present invention is intended to be illustrative, but not limiting, of the scope of the invention which is set forth in the following claims.

What is claimed is:

1. An improved washer for removing chemicals from a mat of porous material impregnated by the chemicals, the washer comprising an elongate housing defining a non-pressurized chamber therein, the housing being positioned above the mat, the housing being polygonal in section with a bottom portion narrower than a top portion, and the housing having a longitudinal slot proximate the mat, and dispersion means within the chamber for controlling the flow of cleaning liquid as it moves through the chamber and into the slot, wherein the improvement comprises:
a pressurized dispersion pipe extending through the elongate chamber above the longitudinal slot;
inlet means attached to the pipe for introducing cleaning liquid into the pipe; and
the pipe defining a plurality of spaced apart holes positioned along the length of the pipe within the housing to permit the cleaning liquid to flow out of the holes and into the chamber.

2. The improved washer of claim 1 wherein the mat is disposed over a portion of a rotary vacuum drum and the housing is positioned outside the drum and disposed parallel to the axis of the drum.

3. The improved washer of claim 2 further comprising paired resilient wipers disposed along the housing adjacent the edge of the slot, the wipers extending from the slot toward the drum a distance sufficient to maintain them in close proximity with the mat, the wipers being at an angle relative to a line connecting the pipe and the slot so that the housing remains substantially vertical and the wipers are generally perpendicular to the mat when the slot is at a chosen position other than centered directly above the drum.

4. The improved washer of claim 1 wherein said holes in said pipe are formed in a lower half of said pipe so the cleaning liquid leaves the pipe in a downward and outward direction.

5. The improved washer of claim 1 further comprising:
paired resilient wipers disposed along the housing adjacent the edges of the slot, the wipers extending from the slot toward the drum a distance sufficient to maintain them in close proximity with the mat, a portion of each wiper proximate the slot being configured to form a bracketing region; and
a plurality of bracketing means, each complementary to the bracketing region of a wiper and at least partially surrounding the bracketing region, for attaching the wiper to the chamber.

6. The improved washer of claim 5 wherein said bracketing region is an enlarged upper portion of the wiper.

7. The improved washer of claim 1 wherein said pipe includes end portions, said pipe being secured to and extending through and beyond first and second ends of the housing, and wherein said washer further comprises means for supporting said pipe end portions whereby the housing is supported by said pipe and said supporting means.

8. The improved washer of claim 7 wherein each said supporting means is adjustable to vary the height of the housing above the mat.

9. The improved washer of claim 1 wherein said inlet means includes removable covers at either end of said pipe.

10. An improved washer for removing chemicals from a mat of porous material impregnated by the chemicals, the mat being disposed over a portion of a rotary vacuum drum, the washer comprising an elongate housing defining a non-pressurized chamber therein, the housing being positioned outside the drum and disposed parallel to the axis of the drum, the housing being polygonal in section with a bottom portion narrower than a top portion, and the housing having a longitudinal slot proximate the drum, and dispersion means within the chamber for controlling the flow of cleaning liquid as it moves through the chamber and into the slot, wherein the improvement comprises:

a pressurized dispersion pipe extending through the elongate chamber above the longitudinal slot;

inlet means attached to the pipe for introducing cleaning liquid into the pipe;

the pipe defining a plurality of spaced apart holes positioned along the length of the pipe within the housing in a lower half of said pipe so that the cleaning liquid leaves the pipe in a downward and outward direction and into the chamber;

paired resilient wipers disposed along the housing adjacent the edges of the slot, the wipers extending from the slot toward the drum a distance sufficient to maintain them in close proximity with the mat, an upper portion of each wiper proximate the slot being enlarged to form a bracketing region, the wipers being at an angle relative to a line connecting the pipe and the slot, the angle being chosen according to the position of the washer relative to the drum so that the chamber remains substantially vertical and the wipers are generally perpendicular to the mat;

a plurality of bracketing means, each complementary to the bracketing region of a wiper and at least partially surrounding the bracketing region, for attaching the wiper to the chamber;

said pipe including end portions extending through and beyond first and second ends of said housing; and means for supporting said pipe end portions whereby the housing is supported by said pipe and said supporting means.

11. An improved washer for removing chemicals from a mat of porous material impregnated by the chemicals, the washer comprising an elongate housing defining a non-pressurized chamber therein, the housing being positioned above the mat, the housing being polygonal in section with a bottom portion narrower than a top portion, and the housing having a longitudinal slot proximate the mat, and dispersion means within the chamber for controlling the flow of cleaning liquid as it moves through the chamber and into the slot, wherein the improvement comprises:

a pressurized dispersion pipe extending through the elongate chamber above the longitudinal slot;

inlet means attached to the pipe for introducing cleaning liquid into the pipe;

the pipe defining a plurality of spaced apart holes positioned along the length of the pipe within the housing to permit the cleaning liquid to flow out of the holes and into the chamber;

said pipe including end portions extending through and beyond first and second ends of said housing; and means for supporting said pipe end portions whereby the housing is supported by said pipe and said supporting means.

* * * * *